US012664702B2

(12) United States Patent
He

(10) Patent No.: US 12,664,702 B2
(45) Date of Patent: Jun. 23, 2026

(54) METHOD FOR GENERATING FACE SHAPE ADJUSTMENT IMAGE, MODEL TRAINING METHOD, APPARATUS AND DEVICE

(71) Applicant: Beijing Zitiao Network Technology Co., Ltd., Beijing (CN)

(72) Inventor: Qian He, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 233 days.

(21) Appl. No.: 18/264,565

(22) PCT Filed: Jan. 29, 2022

(86) PCT No.: PCT/CN2022/075045
§ 371 (c)(1),
(2) Date: Aug. 7, 2023

(87) PCT Pub. No.: WO2022/166897
PCT Pub. Date: Aug. 11, 2022

(65) Prior Publication Data
US 2024/0046538 A1     Feb. 8, 2024

(30) Foreign Application Priority Data

Feb. 7, 2021   (CN) .......................... 202110169700.3

(51) Int. Cl.
*G06T 11/60*          (2026.01)
*G06T 5/20*           (2006.01)

(52) U.S. Cl.
CPC ................ *G06T 11/60* (2013.01); *G06T 5/20* (2013.01); *G06T 2207/20081* (2013.01); *G06T 2207/30201* (2013.01)

(58) Field of Classification Search
CPC ....................................................... G06T 11/60
See application file for complete search history.

(56) References Cited

U.S. PATENT DOCUMENTS

2008/0088712 A1*   4/2008   Craig ................... H04N 5/2628
                                                          386/E5.067
2015/0098646 A1    4/2015   Paris et al.
                    (Continued)

FOREIGN PATENT DOCUMENTS

CN        107492067 A      12/2017
CN        108876751 A      11/2018
                  (Continued)

OTHER PUBLICATIONS

China National Intellectual Property Administration, Office Action and Search Report Issued in Application No. 202110169700.3, Aug. 23, 2021, 15 pages.

(Continued)

*Primary Examiner* — Shivang I Patel
(74) *Attorney, Agent, or Firm* — Alleman Hall LLP

(57)          ABSTRACT

Embodiments of the present disclosure relate to a method for generating a face shape adjustment image, a model training method, an apparatus, and a device. The method for generating a face shape adjustment image includes: acquiring an original facial image; obtaining a face shape adjustment image corresponding to the original facial image by using a pre-trained face shape adjustment model, where the face shape adjustment model is obtained by training based on a first facial sample image, a second facial sample image, a minimum face parameter and a maximum face parameter, a face parameter corresponding to the first facial sample image is the minimum face parameter, and a face parameter corresponding to the second facial sample image is the maximum face parameter.

20 Claims, 2 Drawing Sheets

Acquiring an original facial image    ⎬~ S101

Obtaining a face shape adjustment image corresponding to the original facial image by using a pre-trained face shape adjustment model    ⎬~ S102

(56)  References Cited

U.S. PATENT DOCUMENTS

| | | | |
|---|---|---|---|
| 2015/0169938 A1* | 6/2015 | Yao | G06V 40/176 |
| | | | 382/103 |
| 2020/0151964 A1 | 5/2020 | Chen et al. | |

FOREIGN PATENT DOCUMENTS

| | | | |
|---|---|---|---|
| CN | 110070484 A | 7/2019 | |
| CN | 110390223 A | 10/2019 | |
| CN | 111047507 A | 4/2020 | |
| CN | 111652828 A | 9/2020 | |
| CN | 112184851 A | 1/2021 | |
| CN | 112330533 A | 2/2021 | |
| CN | 112837213 A | 5/2021 | |

OTHER PUBLICATIONS

China National Intellectual Property Administration, Office Action and Search Report Issued in Application No. 202110169700.3, Nov. 22, 2021, 14 pages.
China National Intellectual Property Administration, Decision on Rejection Issued in Application No. 202110169700.3, Mar. 9, 2022, 7 pages. Submitted with partial English translation.
China National Intellectual Property Administration, International Search Report and Written Opinion Issued in Application No. PCT/CN2022/075045, Apr. 12, 2022, WIPO, 14 pages.

* cited by examiner

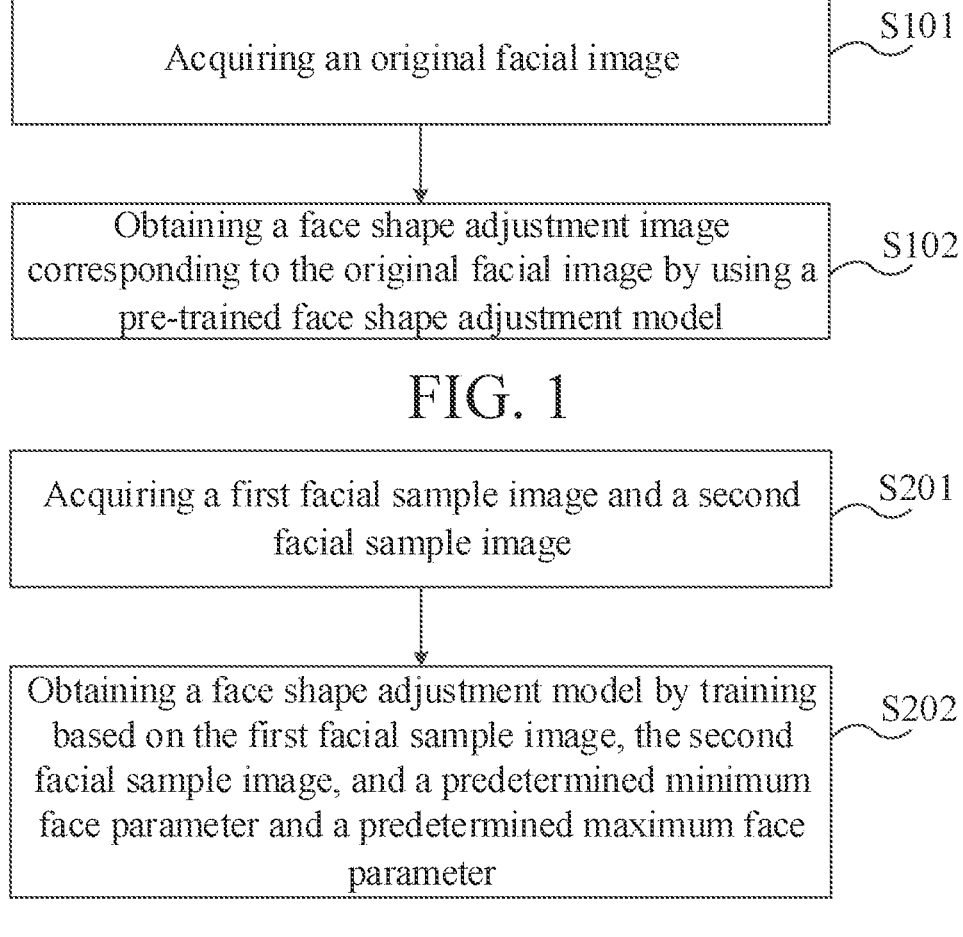

| Acquiring an original facial image | S101 |

FIG. 1

| Obtaining a face shape adjustment image corresponding to the original facial image by using a pre-trained face shape adjustment model | S102 |

| Acquiring a first facial sample image and a second facial sample image | S201 |

| Obtaining a face shape adjustment model by training based on the first facial sample image, the second facial sample image, and a predetermined minimum face parameter and a predetermined maximum face parameter | S202 |

FIG. 2

METHOD FOR GENERATING FACE SHAPE ADJUSTMENT IMAGE, MODEL TRAINING METHOD, APPARATUS AND DEVICE

CROSS-REFERENCES TO RELATED APPLICATIONS

The present disclosure is a National Stage of International Application No. PCT/CN2022/075045, filed on Jan. 29, 2022, which claims priority to China Patent Application No. 202110169700.3, filed on Feb. 7, 2021, entitled "METHOD FOR GENERATING FACE SHAPE ADJUSTMENT IMAGE, MODEL TRAINING METHOD, APPARATUS AND DEVICE". The content of the above applications are hereby incorporated by reference in their entireties.

TECHNICAL FIELD

The present disclosure relates to the field of image processing technology and, in particular, to a method for generating a face shape adjustment image, a model training method, an apparatus and a device.

BACKGROUND

At present, with gradual enrichment of functions of video interactive applications, image style conversion has become a new interesting processing method. The image style conversion refers to style conversion of one or more images to generate a style image that meets user requirements.

However, style conversion types supported in existing video interactive applications are still limited, which cannot meet personalized image style conversion requirements of users.

SUMMARY

In order to solve or at least partially solve the above technical problems, embodiments of the present disclosure provide a method for generating a face shape adjustment image, a model training method, an apparatus, and a device.

In a first aspect, an embodiment of the present disclosure provides a method for generating a face shape adjustment image, including:

acquiring an original facial image;

obtaining a face shape adjustment image corresponding to the original facial image by using a pre-trained face shape adjustment model;

where the face shape adjustment model is obtained by training based on a first facial sample image, a second facial sample image, a minimum face parameter and a maximum face parameter, a face parameter corresponding to the first facial sample image is the minimum face parameter, and a face parameter corresponding to the second facial sample image is the maximum face parameter;

an adjustment degree of the face shape adjustment image relative to the original facial image is within a degree range determined from an adjustment degree indicated by the minimum face parameter and an adjustment degree indicated by the maximum face parameter.

In a second aspect, an embodiment of the present disclosure further provides a method for training a face shape adjustment model, including:

acquiring a first facial sample image and a second facial sample image;

obtaining a face shape adjustment model by training based on the first facial sample image, the second facial sample image, and a predetermined minimum face parameter and a predetermined maximum face parameter;

where a face parameter corresponding to the first facial sample image is the minimum face parameter, and a face parameter corresponding to the second facial sample image is the maximum face parameter;

the face shape adjustment model is used to obtain a face shape adjustment image corresponding to an original facial image, and an adjustment degree of the face shape adjustment image relative to the original facial image is within a degree range determined from an adjustment degree indicated by the minimum face parameter and an adjustment degree indicated by the maximum face parameter.

In a third aspect, an embodiment of the present disclosure further provides an apparatus for generating a face shape adjustment image, including:

an original facial image acquiring module, configured to acquire an original facial image;

a face shape adjustment image generating module, configured to obtain a face shape adjustment image corresponding to the original facial image by using a pre-trained face shape adjustment model;

where the face shape adjustment model is obtained by training based on a first facial sample image, a second facial sample image, a minimum face parameter and a maximum face parameter, a face parameter corresponding to the first facial sample image is the minimum face parameter, and a face parameter corresponding to the second facial sample image is the maximum face parameter;

an adjustment degree of the face shape adjustment image relative to the original facial image is within a degree range determined from an adjustment degree indicated by the minimum face parameter and an adjustment degree indicated by the maximum face parameter.

In a fourth aspect, an embodiment of the present disclosure further provides an apparatus for training a face shape adjustment model, including:

a sample image acquiring module, configured to acquire a first facial sample image and a second facial sample image;

a model training module, configured to obtain a face shape adjustment model by training based on the first facial sample image, the second facial sample image, and a predetermined minimum face parameter and a predetermined maximum face parameter;

where a face parameter corresponding to the first facial sample image is the minimum face parameter, and a face parameter corresponding to the second facial sample image is the maximum face parameter;

the face shape adjustment model is used to obtain a face shape adjustment image corresponding to an original facial image, and an adjustment degree of the face shape adjustment image relative to the original facial image is within a degree range determined from an adjustment degree indicated by the minimum face parameter and an adjustment degree indicated by the maximum face parameter.

In a fifth aspect, an embodiment of the present disclosure further provides an electronic device, including a memory and a processor, where the memory stores a computer program, and the computer program, when executed by the processor, causes the electronic device to implement the method for generating a face shape adjustment image or the method for training a face shape adjustment model according to any one of the embodiments of the present disclosure.

In a sixth aspect, an embodiment of the present disclosure further provides a computer-readable storage medium, where the computer-readable storage medium stores a computer program, and the computer program, when executed by a computing device, causes the computing device to implement the method for generating a face shape adjustment image or the method for training a face shape adjustment model according to any one of the embodiments of the present disclosure.

In a seventh aspect, an embodiment of the present disclosure further provides a computer program product, including a computer program or computer program instructions. The computer program or the computer program instructions, when executed by a computing device, cause the computing device to implement the method for generating a face shape adjustment image or the method for training a face shape adjustment model according to any one of the embodiments of the present disclosure.

In an eighth aspect, an embodiment of the present disclosure further provides a computer program. The computer program, when executed by a computing device, causes the computing device to implement the method for generating a face shape adjustment image or the method for training a face shape adjustment model according to any one of the embodiments of the present disclosure.

Compared with the related art, the technical solutions provided by the embodiments of the present disclosure have at least the following advantages.

In the embodiments of the present disclosure, a face shape adjustment model is pre-trained, and then a face shape adjustment image corresponding to an original facial image, such as a thin face image or a fat face image, is obtained by using the model, which enriches image editing functions in a terminal. Taking a video interactive application as an example, a face shape adjustment model is called so as to not only enrich image editing functions of the application, but also improve interestingness of the application, so that users are provided with a relatively novel special-effect processing method, thereby improving the user experience. Moreover, through model training, the face shape adjustment image can learn a mapping relationship between face features of different face shapes, so that other features of the face can be adjusted adaptively during a process of changing a face contour, thereby matching the face features with an adjusted face shape, and displaying a higher image effect, for example, a face display effect is more natural, improving intelligence of generating the face shape adjustment image and a display effect of special effects.

BRIEF DESCRIPTION OF THE DRAWINGS

The accompanying drawings here are incorporated into the specification and constitute a part of the specification, illustrate embodiments consistent with the present disclosure, and are used together with the specification to explain the principles of the present disclosure.

In order to more clearly illustrate the technical solutions in the embodiments of the present disclosure or in the related art, the following will briefly introduce the drawings required for describing the embodiments or the related art. Obviously, for those of ordinary skills in the art, other drawings can also be obtained based on these drawings without creative effort.

FIG. 1 is a flowchart of a method for generating a face shape adjustment image provided by an embodiment of the present disclosure.

FIG. 2 is a flowchart of a method for training a face shape adjustment model provided by an embodiment of the present disclosure.

DESCRIPTION OF EMBODIMENTS

Figure 3:
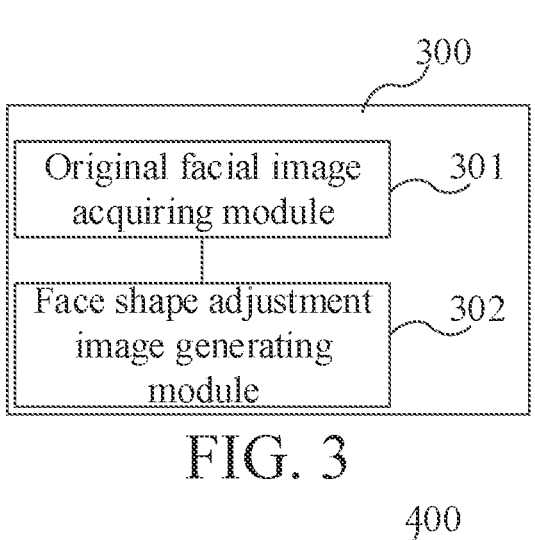
FIG. 3 is a schematic structural diagram of an apparatus for generating a face shape adjustment image provided by an embodiment of the present disclosure.

In order to understand the above objects, features and advantages of the present disclosure more clearly, the solutions of the present disclosure will be further described below. It should be noted that the embodiments of the present disclosure and the features in the embodiments can be combined with each other without conflict.

Many specific details are set forth in the following description to facilitate a full understanding of the present disclosure, but the present disclosure can also be implemented in other ways different from those described herein. Obviously, the described embodiments are part of the embodiments of the present disclosure, but not all of the embodiments.

FIG. 1 is a flowchart of a method for generating a face shape adjustment image provided by an embodiment of the present disclosure. The method can be executed by an apparatus for generating a face shape adjustment image; the apparatus can be implemented by software and/or hardware, and can be integrated on any electronic device with computing power, such as a mobile terminal, a tablet, a laptop and other terminal.

Moreover, the apparatus for generating a face shape adjustment image can be implemented in a form of an independent application or an integrated applet on a public platform, and can also be implemented as a functional module integrated in an application or an applet with a function for generating the face shape adjustment image. The application or the applet can include but not limited to a video interactive application or a video interactive applet.

As shown in FIG. 1, the method for generating a face shape adjustment image provided by the embodiment of the present disclosure may include the following steps.

S101: acquiring an original facial image.

The original facial image refers to an original image without face shape adjustment, which may include a facial image of any object, such as a human face image, an animal face image and so on. For example, when a user has a need to generate a face shape adjustment image, he/she can upload an image stored in a terminal or shoot an image or a video in real-time through an image shooting apparatus of the terminal, and according to the user's image selection operation, image shooting operation or image uploading operation in the terminal, the terminal acquires the original facial image to be processed.

Taking the original facial image shooting by calling the terminal camera in the video interactive application as an example, after the application jumps to an image acquisition interface, photographing prompt information can be displayed on the image acquisition interface, the photographing prompt information can be used to prompt at least one of the following information: placing a face of a shooting object in a preset position on a terminal screen (such as a middle position of the screen, etc.), adjusting a distance between the face and the terminal screen (a face area with a suitable size can be obtained by adjusting the distance, to avoid the face area being too large or too small, etc.) and adjusting a rotation angle of the face (different rotation angles correspond to different face orientations, such as a front face or a side face, etc.). According to the photographing prompt information, an image is taken, so that the application can conveniently obtain an original facial image that conforms to a model input. Further, the application can also pre-store a photographing template according to an image condition required by the model input, and the photographing template pre-defines information such as a position of a face on an image, a size of a face area on an image, a face angle and an image size. The application can use the photographing template to obtain a required original facial image according to a photographing operation of the user.

Of course, when there is a difference between the original facial image obtained by shooting and the image condition required by the model input (such as the face position on the image, the image size etc.), the original facial image obtained by shooting can be processed by an operation such as cropping, scaling, and rotation to obtain the original facial image that conforms to the model input.

S102: obtaining a face shape adjustment image corresponding to the original facial image by using a pre-trained face shape adjustment model.

The face shape adjustment model is obtained by training based on a first facial sample image, a second facial sample image, a minimum face parameter and a maximum face parameter, a face parameter corresponding to the first facial sample image is the minimum face parameter, for example, a value can be 0, and a face parameter corresponding to the second facial sample image is the maximum face parameter, for example, a value can be 1, that is, the first facial sample image and the second facial sample image respectively correspond to different face shapes. For example, if the first facial sample image corresponds to a facial image with a standard face shape, the second facial sample image may correspond to a facial image with a thin face shape or a fat face shape. In a process of model training, a face parameter can be set to any value between the minimum face parameter and the maximum face parameter. Regarding a specific training implementation of the face shape adjustment model, the embodiments of the present disclosure impose no specific limitation. On the basis of ensuring that a finally trained model has a function of generating a face shape adjustment image, those skilled in the art can adopt any available training mode and flexibly select an available model structure.

An adjustment degree of the face shape adjustment image relative to the original facial image is within a degree range determined from an adjustment degree indicated by the minimum face parameter and an adjustment degree indicated by the maximum face parameter. For example, the adjustment degree indicated by the minimum face parameter is no adjustment (i.e., no change to a face shape), and the adjustment degree indicated by the maximum face parameter is the fattest or thinnest, then the adjustment degree of the face shape adjustment image relative to the original facial image can be within a range from the face shape having no adjustment to the face shape being the fattest, or within a range from the face shape having no adjustment to the face shape being the thinnest, including a case where the adjustment degree is the fattest or the thinnest.

A face parameter corresponding to the face shape adjustment image obtained by using the face shape adjustment model is the same as a face parameter preset in a model training stage, that is, for any face shape adjustment model sent to the terminal, a face shape adjustment degree to the original facial image is determined. The greater the face parameter preset in the model training stage, the greater the face shape adjustment degree to the original facial image by a trained face shape adjustment model. The smaller the face parameter preset in the model training stage, the smaller the face shape adjustment degree to the original facial image by a trained face shape adjustment model. Moreover, a type of a sample image used in the model training stage is the same as a type of the original facial image to be processed in a model application stage. For example, if the sample image used in the model training stage is a human face image, the original facial image to be processed in the model application stage is also a human face image, thereby ensuring a high image generation effect.

Taking the video interactive application as an example, it can provide users with multiple props about face shape adjustment, and each prop corresponds to a face shape adjustment model under a different face parameter, so that the users can determine a selected prop according to an image generation requirement, and then obtain the face shape adjustment image that meets the image generation requirement, thereby increasing the interestingness of image generation.

In an embodiment of the present disclosure, in an implementation, the face shape adjustment model includes a thin face adjustment model or a fat face adjustment model;

accordingly, obtaining the face shape adjustment image corresponding to the original facial image by using the pre-trained face shape adjustment model includes:

obtaining, by using the thin face adjustment model, a face shape adjustment image, corresponding to the original facial image, in which a face shape becomes thin; or obtaining, by using the fat face adjustment model, a face shape adjustment image, corresponding to the original facial image, in which a face shape becomes fat.

Using the face shape adjustment model to generate the face shape adjustment image corresponding to the original facial image, compared with a solution of using stickers to implement face shape adjustment, can make the generated face shape adjustment image present a more natural effect, and can intelligently generate, for different original facial images, face shape adjustment images corresponding to the respective original facial images. Through model training, the face shape adjustment image can learn a mapping relationship between face features of different face shapes, so that other features of the face can be adjusted adaptively during a process of changing a face contour, thereby matching the face features with an adjusted face shape, and displaying a higher image effect.

In an embodiment of the present disclosure, the face shape adjustment model is obtained by training based on a third facial sample image and a face shape adjustment sample image, where a face parameter corresponding to the third facial sample image is the minimum face parameter;

the face shape adjustment sample image is generated by a pre-trained facial image generation model based on the third facial sample image and a first preset face parameter;

the facial image generation model is obtained by training based on the first facial sample image, the second facial sample image and a second preset face parameter;

the minimum face parameter is a lower limit of values of the first preset face parameter and the second preset face parameter, and the maximum face parameter is an upper limit of values of the first preset face parameter and the second preset face parameter. Specific values of the first preset face parameter and the second preset face parameter can be set adaptively in the process of model training.

Exemplarily, the above-mentioned model training process may include: first, taking the second preset face parameter (a value for which can be any value ranging from 0 to 1) as a constraint parameter of an image generation model, and training the image generation model based on the first facial sample image and the second facial sample image to obtain the facial image generation model, where an available image generation module may include, but is not limited to, a generative adversarial networks (GAN) model, etc., and specific implementation principles can refer to related art. Then, taking the first preset face parameter (a value for which can be any value ranging from 0 to 1, for example, 1) as a constraint parameter of the facial image generation model, and obtaining the face shape adjustment sample image corresponding to the third facial sample image based on the facial image generation model. That is, the third facial sample image and a corresponding face shape adjustment sample image can be used as paired training data in a subsequent model training process, and the third facial sample image and the first facial sample image can be the same sample image or different sample images, which is not specifically limited in the embodiments of the present disclosure. Finally, training a style image generation model based on the third facial sample image and the face shape adjustment sample image to obtain the face shape adjustment model, where an available style image generation model may include, for example, a conditional generative adversarial networks (CGAN) model.

In an implementation, in the process of model training, the paired training data can also be optimized to improve sample quality, thereby improving a training effect of the face shape adjustment model. Exemplarily, the face shape adjustment model is obtained by training based on the third facial sample image and the face shape adjustment sample image in which preset editing processing is performed, and the face shape adjustment sample image in which the preset editing processing is performed includes at least one of the following:

a face shape adjustment sample image in which filtering processing is performed on a face area. For example, a beauty filter is applied to the face area of the face shape adjustment sample image, including but not limited to retouching and whitening treatment, so as to improve a face display effect on the sample image;

a face shape adjustment sample image in which deformation processing is performed on a face shape. For example, any available face deformation processing method can be used to re-adjust the face shape on the face shape adjustment sample image, specifically, e.g., processing the face on the face shape adjustment sample image in which the face shape becomes fat to be more rounded, or processing the face on the face shape adjustment sample image in which the face shape becomes thin to be more linear, so as to implement an effect of face optimization;

a face shape adjustment sample image in which background restoration is performed based on a background of the third facial sample image. For example, replace a background on the face shape adjustment sample image with the background on the third facial sample image, which can keep a consistency between the background on the third facial sample image and the background on a corresponding face shape adjustment sample image, and avoid impacts to a model training effect due to a background change, where the background refers to a remaining area on the image other than the face area;

a face shape adjustment sample image in which an image clarity is adjusted. For example, any available image clarity adjustment method can be used to improve the image clarity, so as to prevent a fuzzy sample image from affecting a model training effect.

In the embodiments of the present disclosure, a face shape adjustment model is pre-trained, and then a face shape adjustment image corresponding to an original facial image, such as a thin face image or a fat face image, is obtained by using the model, which enriches image editing functions in a terminal. Taking a video interactive application as an example, a face shape adjustment model is called so as to not only enrich image editing functions of the application, but also improve interestingness of the application, so that users are provided with a relatively novel special-effect processing method, thereby improving the user experience. Moreover, through model training, the face shape adjustment image can learn a mapping relationship between face features of different face shapes, so that other features of the face can be adjusted adaptively during a process of changing a face contour, thereby matching the face features with an adjusted face shape, and displaying a higher image effect, for example, a face display effect is more natural, improving intelligence of generating the face shape adjustment image and a display effect of special effects.

On the basis of the above technical solution, in an implementation, the method for generating a face shape adjustment image provided by the embodiment of the present disclosure may further include:

acquiring an original image, identifying facial key points on the original image, and adjusting a face position on the original image based on the identified facial key points to obtain the original facial image.

The original facial image conforms to an input image size required by the face shape adjustment model. The original image may be an image obtained by a terminal according to an image selection operation, an image shooting operation or an image uploading operation of the user in the terminal. Then, the terminal uses a facial key point identification technology, such as a key point identification technology for a human face, to identify the facial key points on the original image, and adjusts a face position on the original image based on the facial key points. Image processing operations involved may include cropping, scaling, rotation, etc., so as to obtain the original facial image that conforms to the model input.

Further, the method for generating a face shape adjustment image provided by the embodiment of the present disclosure may further include: fusing a face area on the face shape adjustment image with a background area on the original image to obtain a target face shape adjustment image corresponding to the original image.

The background area on the original image refers to a remaining image area on the original image except the face area. Exemplarily, image processing technology can be used to extract the face area from the face shape adjustment image, extract the background area from the original image, and then fuse (or mix) the two areas according to a position of the background area and a position of the face area on the image in which preset editing processing is performed, and the preset editing processing includes at least one of the following:

> performing filtering processing on a face area in the face shape adjustment sample image;
>
> performing deformation processing on a face shape in the face shape adjustment sample image;
>
> using a background of the third facial sample image to perform restoration on a background of the face shape adjustment sample image;
>
> adjusting an image clarity of the face shape adjustment sample image.

In the embodiment of the present disclosure, the face shape adjustment model is pre-trained in a server and then sent to a terminal, so that the face shape adjustment image corresponding to the original facial image, such as a thin face image or a fat face image, can be obtained in the terminal by using the model, which enriches image editing functions in the terminal. Taking a video interactive application as an example, the face shape adjustment model is called so as to not only enrich image editing functions of the application, but also improve interestingness of the application, so that users are provided with a relatively novel special-effect processing method, thereby improving the user experience.

FIG. 3 is a schematic structural diagram of an apparatus for generating a face shape adjustment image provided by an embodiment of the present disclosure. The apparatus can be implemented by software and/or hardware, and can be integrated on any electronic device with computing power, such as a mobile terminal, a tablet, a laptop and other terminal.

As shown in FIG. 3, the apparatus 300 for generating a face shape adjustment image provided by the embodiment of the present disclosure may include an original facial image acquiring module 301 and a face shape adjustment image generating module 302.

The original facial image acquiring module 301 is configured to acquire an original facial image;

> the face shape adjustment image generating module 302 is configured to obtain a face shape adjustment image corresponding to the original facial image by using a pre-trained face shape adjustment model;
>
> where the face shape adjustment model is obtained by training based on a first facial sample image, a second facial sample image, a minimum face parameter and a maximum face parameter, a face parameter corresponding to the first facial sample image is the minimum face parameter, and a face parameter corresponding to the second facial sample image is the maximum face parameter;
>
> an adjustment degree of the face shape adjustment image relative to the original facial image is within a degree range determined from an adjustment degree indicated by the minimum face parameter and an adjustment degree indicated by the maximum face parameter.

In an implementation, the face shape adjustment model includes a thin face adjustment model or a fat face adjustment model;

> accordingly, the face shape adjustment image generating module 302 includes:
>
> a first image generation unit configured to obtain, by using the thin face adjustment model, a face shape adjustment image, corresponding to the original facial image, in which a face shape becomes thin; or
>
> a second image generation unit configured to obtain, by using the fat face adjustment model, a face shape adjustment image, corresponding to the original facial image, in which a face shape becomes fat.

In an implementation, the face shape adjustment model is obtained by training based on a third facial sample image and a face shape adjustment sample image, where a face parameter corresponding to the third facial sample image is the minimum face parameter;

> the face shape adjustment sample image is generated by a pre-trained facial image generation model based on the third facial sample image and a first preset face parameter;
>
> the facial image generation model is obtained by training based on the first facial sample image, the second facial sample image and a second preset face parameter;
>
> the minimum face parameter is a lower limit of values of the first preset face parameter and the second preset face parameter, and the maximum face parameter is an upper limit of values of the first preset face parameter and the second preset face parameter.

In an implementation, the face shape adjustment model is obtained by training based on the third facial sample image and the face shape adjustment sample image in which preset editing processing is performed, and the face shape adjustment sample image in which the preset editing processing is performed includes at least one of the following:

> a face shape adjustment sample image in which filtering processing is performed on a face area;
>
> a face shape adjustment sample image in which deformation processing is performed on a face shape;
>
> a face shape adjustment sample image in which background restoration is performed based on a background of the third facial sample image;
>
> a face shape adjustment sample image in which an image clarity is adjusted.

The apparatus for generating a face shape adjustment image provided by the embodiment of the present disclosure can execute any method for generating a face shape adjustment image provided by the embodiments of the present disclosure, and has corresponding functional modules for executing the method and beneficial effects. For contents not described in detail in the apparatus embodiments of the present disclosure, reference can be made to the description in any method embodiments of the present disclosure.

Figure 4:
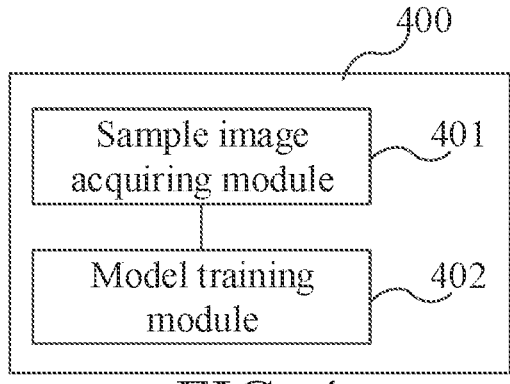
FIG. 4 is a schematic structural diagram of an apparatus for training a face shape adjustment model provided by an embodiment of the present disclosure.

FIG. 4 is a schematic structural diagram of an apparatus for training a face shape adjustment model provided by an embodiment of the present disclosure. The apparatus can be implemented by software and/or hardware, and can be integrated on any electronic device with computing power, such as a server.

As shown in FIG. 4, the apparatus 400 for training a face shape adjustment model provided by the embodiment of the present disclosure may include a sample image acquiring module 401 and a model training module 402.

The sample image acquiring module 401 is configured to acquire a first facial sample image and a second facial sample image;

> the model training module 402 is configured to obtain a face shape adjustment model by training based on the first facial sample image, the second facial sample image, and a predetermined minimum face parameter and a predetermined maximum face parameter;
>
> where a face parameter corresponding to the first facial sample image is the minimum face parameter, a face parameter corresponding to the second facial sample image is the maximum face parameter, the face shape adjustment model is used to obtain a face shape adjustment image corresponding to an original facial image, and an adjustment degree of the face shape adjustment image relative to the original facial image is within a degree range determined from an adjustment degree indicated by the minimum face parameter and an adjustment degree indicated by the maximum face parameter.

In an implementation, the model training module 402 includes:

a facial image generation model determining unit, configured to take a second preset face parameter as a constraint parameter of an image generation model, and train the image generation model based on the first facial sample image and the second facial sample image to obtain a facial image generation model;

a face shape adjustment sample image generating unit, configured to take a first preset face parameter as a constraint parameter of the facial image generation model, and obtain, based on the facial image generation model, a face shape adjustment sample image corresponding to a third facial sample image, where a face parameter corresponding to the third facial sample image is the minimum face parameter;

a face shape adjustment model determining unit, configured to train a style image generation model based on the third facial sample image and the face shape adjustment sample image to obtain the face shape adjustment model.

The apparatus for training a face shape adjustment model provided by the embodiment of the present disclosure can execute any method for training a face shape adjustment model provided by the embodiments of the present disclosure, and has corresponding functional modules for executing the method and beneficial effects. For contents not described in detail in the apparatus embodiments of the present disclosure, reference can be made to the description in any method embodiments of the present disclosure.

Figure 5:
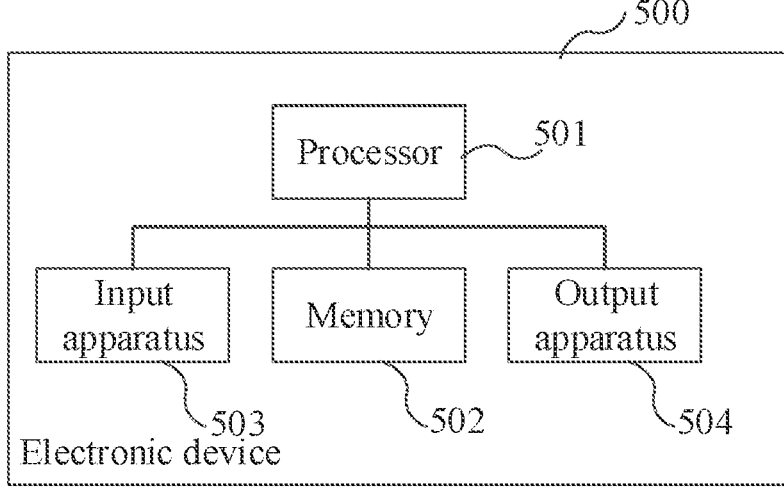
FIG. 5 is a schematic structural diagram of an electronic device provided by an embodiment of the present disclosure.

FIG. 5 is a schematic structural diagram of an electronic device provided by an embodiment of the present disclosure, which is used to exemplarily illustrate the electronic device that implements the method for generating a face shape adjustment image or the method for training a face shape adjustment model provided by the embodiments of the present disclosure. The electronic device in the embodiment of the present disclosure may include, but is not limited to, a mobile terminal such as a mobile phone, a laptop, a digital broadcast receiver, a personal digital assistant (PDA), a tablet computer (Portable Android Device, PAD), a portable media player (PMP), a vehicle-mounted terminal (for example, a vehicle-mounted navigation terminal), etc., and a fixed terminal such as a digital television (TV), a desktop computer, a smart home device, a wearable electronic device, a server, etc. The electronic device shown in FIG. 5 is only an example, and should not bring any limitation to the functions and scope of use of the embodiments of the present disclosure.

As shown in FIG. 5, the electronic device 500 includes one or more processors 501 and a memory 502.

The processor 501 may be a central processing unit (CPU) or other form of processing unit with data processing capability and/or instruction execution capability, and may control other components in the electronic device 500 to perform desired functions.

The memory 502 may include one or more computer program products, and the computer program product may include various forms of computer-readable storage media, such as a volatile memory and/or a non-volatile memory. The volatile memory may include, for example, a random access memory (RAM) and/or a cache memory. The non-volatile memory may include, for example, a read only memory (ROM), a hard disk, a flash memory, etc. A computer-readable storage medium can store one or more computer program instructions, and the processor 501 can run the program instructions to implement the method for generating a face shape adjustment image or the method for training a face shape adjustment model provided by the embodiments of the present disclosure, and implement other desired functions. The computer-readable storage medium can store various contents such as an input signal, a signal component, a noise component and so on.

In an aspect, the method for generating a face shape adjustment image provided by the embodiment of the present disclosure may include: acquiring an original facial image; obtaining a face shape adjustment image corresponding to the original facial image by using a pre-trained face shape adjustment model; where the face shape adjustment model is obtained by training based on a first facial sample image, a second facial sample image, a minimum face parameter and a maximum face parameter, a face parameter corresponding to the first facial sample image is the minimum face parameter, and a face parameter corresponding to the second facial sample image is the maximum face parameter; an adjustment degree of the face shape adjustment image relative to the original facial image is within a degree range determined from an adjustment degree indicated by the minimum face parameter and an adjustment degree indicated by the maximum face parameter.

In another aspect, the method for training a face shape adjustment model provided by the embodiment of the present disclosure may include: acquiring a first facial sample image and a second facial sample image; obtaining a face shape adjustment model by training based on the first facial sample image, the second facial sample image, and a predetermined minimum face parameter and a predetermined maximum face parameter; where a face parameter corresponding to the first facial sample image is the minimum face parameter, and a face parameter corresponding to the second facial sample image is the maximum face parameter; the face shape adjustment model is used to obtain a face shape adjustment image corresponding to an original facial image, and an adjustment degree of the face shape adjustment image relative to the original facial image is within a degree range determined from an adjustment degree indicated by the minimum face parameter and an adjustment degree indicated by the maximum face parameter.

It should be understood that the electronic device 500 may further perform other optional implementations provided by the method embodiments of the present disclosure.

In an example, the electronic device 500 may further include an input apparatus 503 and an output apparatus 504, which are interconnected by a bus system and/or other forms of connection mechanisms (not shown).

In addition, the input apparatus 503 may further include, for example, a keyboard, a mouse, and the like.

The output apparatus 504 may output various information to the outside, including determined distance information, direction information, etc. The output apparatus 504 may include, for example, a display, a speaker, a printer, a communication network and a remote output device connected thereto.

Of course, for simplicity, only some components related to the present disclosure in the electronic device 500 are shown in FIG. 5, and components such as a bus, an input/output interface, etc. are omitted. Besides, according to a specific application, the electronic device 500 may further include any other suitable components.

In addition to the above methods and devices, an embodiment of the present disclosure further provides a computer program product, which includes a computer program or computer program instructions. The computer program or the computer program instructions, when executed by a computing device, cause the computing device to implement any of the method for generating a face shape adjustment image or the method for training a face shape adjustment model provided by the embodiments of the present disclosure.

The computer program product may be written in any combination of one or more programming languages to execute program codes for operations of the embodiments of the present disclosure, and the programming languages include object-oriented programming languages such as Java, C++, and also conventional procedural programming languages such as "C" language or similar programming languages. The program codes can be executed entirely on a user electronic device, executed partly on the user electronic device, executed as an independent software package, executed partly on the user electronic device and partly on a remote electronic device, or executed entirely on the remote electronic device.

In addition, an embodiment of the present disclosure can further provide a computer-readable storage medium, on which computer program instructions are stored. The computer program instructions, when executed by a computing device, cause the computing device to implement any of the method for generating a face shape adjustment image or the method for training a face shape adjustment model provided by the embodiments of the present disclosure.

In an aspect, the method for generating a face shape adjustment image provided by the embodiment of the present disclosure may include: acquiring an original facial image; obtaining a face shape adjustment image corresponding to the original facial image by using a pre-trained face shape adjustment model; where the face shape adjustment model is obtained by training based on a first facial sample image, a second facial sample image, a minimum face parameter and a maximum face parameter, a face parameter corresponding to the first facial sample image is the minimum face parameter, and a face parameter corresponding to the second facial sample image is the maximum face parameter; an adjustment degree of the face shape adjustment image relative to the original facial image is within a degree range determined from an adjustment degree indicated by the minimum face parameter and an adjustment degree indicated by the maximum face parameter.

In another aspect, the method for training a face shape adjustment model provided by the embodiment of the present disclosure may include: acquiring a first facial sample image and a second facial sample image; obtaining a face shape adjustment model by training based on the first facial sample image, the second facial sample image, and a predetermined minimum face parameter and a predetermined maximum face parameter; where a face parameter corresponding to the first facial sample image is the minimum face parameter, and a face parameter corresponding to the second facial sample image is the maximum face parameter; the face shape adjustment model is used to obtain a face shape adjustment image corresponding to an original facial image, and an adjustment degree of the face shape adjustment image relative to the original facial image is within a degree range determined from an adjustment degree indicated by the minimum face parameter and an adjustment degree indicated by the maximum face parameter.

It should be understood that the computer program instructions, when executed by the computing device, can further cause the computing device to implement other optional implementations provided by the method embodiments of the present disclosure.

The computer-readable storage medium can adopt any combination of one or more readable media. The readable medium may be a readable signal medium or a readable storage medium. The readable storage medium may include, for example, but is not limited to, an electronic, magnetic, optical, electromagnetic, infrared or semiconductor system, apparatus or device, or any suitable combination of the above. More specific examples (a non-exhaustive list) of the readable storage medium include: an electrically connected portable disk with one or more wires, a hard disk, a random access memory (RAM), a read only memory (ROM), an erasable programmable read only memory (EPROM or flash memory), an optical fiber, a portable compact disc-read only memory (CD-ROM), an optical storage device, a magnetic storage device, or any suitable combination of the above.

It should be noted that in this paper, relational terms such as "first" and "second" are only used to distinguish one entity or operation from another entity or operation, and do not necessarily require or imply any actual relationship or order between these entities or operations. Moreover, terms "including", "comprising" or any other variation thereof are intended to cover non-exclusive inclusion, so that a process, method, object or device including a series of elements includes not only those elements, but also other elements not explicitly listed or elements inherent to such process, method, object or device. Without further restrictions, an element defined by a phrase "including a" does not exclude that there are other identical elements in the process, method, object or device including the element.

The above descriptions are only specific embodiments of the present disclosure, so that those skilled in the art can understand or implement the present disclosure. Various modifications to these embodiments will be obvious to those skilled in the art, and general principles defined herein can be implemented in other embodiments without departing from the spirit or scope of the present disclosure. Therefore, the present disclosure will not be limited to these embodiments herein, but rather to the widest scope consistent with the principles and novel features disclosed herein.

What is claimed is:

1. A method for generating a face shape adjustment image, comprising:

acquiring an original facial image; and generating a face shape adjustment image corresponding to the original facial image by using a pre-trained face shape adjustment model, wherein the face shape adjustment model is obtained by training based on a first facial sample image, a second facial sample image, a minimum face parameter and a maximum face parameter, a face parameter corresponding to the first facial sample image is the minimum face parameter, and a face parameter corresponding to the second facial sample image is the maximum face parameter, wherein a face parameter corresponding to the face shape adjustment image obtained by using the face shape adjustment model is the same as a face parameter preset in a model training stage, wherein an adjustment degree of the face shape adjustment image relative to the original facial image is within a degree range determined from an adjustment degree indicated by the minimum face parameter and an adjustment degree indicated by the maximum face parameter, and wherein the face shape adjustment model comprises a fat face adjustment model, accordingly, generating the face shape adjustment image corresponding to the original facial image by using the pre-trained face shape adjustment model comprises: generating, by using the fat face adjustment model, a face shape adjustment image, corresponding to the original facial image, in which a face shape becomes fat.

2. The method according to claim 1, wherein the face shape adjustment model comprises a thin face adjustment model;

accordingly, generating the face shape adjustment image corresponding to the original facial image by using the pre-trained face shape adjustment model comprises:

generating, by using the thin face adjustment model, a face shape adjustment image, corresponding to the original facial image, in which a face shape becomes thin.

3. The method according to claim 2, wherein:

the face shape adjustment model is obtained by training based on a third facial sample image and a face shape adjustment sample image, wherein a face parameter corresponding to the third facial sample image is the minimum face parameter;

the face shape adjustment sample image is generated by a pre-trained facial image generation model based on the third facial sample image and a first preset face parameter;

the facial image generation model is obtained by training based on the first facial sample image, the second facial sample image and a second preset face parameter;

the minimum face parameter is a lower limit of values of the first preset face parameter and the second preset face parameter, and the maximum face parameter is an upper limit of values of the first preset face parameter and the second preset face parameter.

4. The method according to claim 1, wherein:

the face shape adjustment model is obtained by training based on a third facial sample image and a face shape adjustment sample image, wherein a face parameter corresponding to the third facial sample image is the minimum face parameter;

the face shape adjustment sample image is generated by a pre-trained facial image generation model based on the third facial sample image and a first preset face parameter;

the facial image generation model is obtained by training based on the first facial sample image, the second facial sample image and a second preset face parameter;

the minimum face parameter is a lower limit of values of the first preset face parameter and the second preset face parameter, and the maximum face parameter is an upper limit of values of the first preset face parameter and the second preset face parameter.

5. The method according to claim 4, wherein the face shape adjustment model is obtained by training based on the third facial sample image and the face shape adjustment sample image in which preset editing processing is performed, and the face shape adjustment sample image in which the preset editing processing is performed comprises at least one of the following:

a face shape adjustment sample image in which filtering processing is performed on a face area;

a face shape adjustment sample image in which deformation processing is performed on a face shape;

a face shape adjustment sample image in which background restoration is performed based on a background of the third facial sample image;

a face shape adjustment sample image in which an image clarity is adjusted.

6. A method for training a face shape adjustment model, comprising:

acquiring a first facial sample image and a second facial sample image; and obtaining a face shape adjustment model by training based on the first facial sample image, the second facial sample image, and a predetermined minimum face parameter and a predetermined maximum face parameter, wherein a face parameter corresponding to the first facial sample image is the minimum face parameter, and a face parameter corresponding to the second facial sample image is the maximum face parameter, wherein a face parameter corresponding to a face shape adjustment image obtained by using the face shape adjustment model is the same as a face parameter preset in a model training stage, wherein the face shape adjustment model is used to obtain the face shape adjustment image corresponding to an original facial image, and an adjustment degree of the face shape adjustment image relative to the original facial image is within a degree range determined from an adjustment degree indicated by the minimum face parameter and an adjustment degree indicated by the maximum face parameter, and wherein the face shape adjustment model comprises a fat face adjustment model, accordingly, generating the face shape adjustment image corresponding to the original facial image by using the pre-trained face shape adjustment model comprises: generating, by using the fat face adjustment model, a face shape adjustment image, corresponding to the original facial image, in which a face shape becomes fat.

7. The method according to claim 6, wherein obtaining the face shape adjustment model by training based on the first facial sample image, the second facial sample image, and the predetermined minimum face parameter and the predetermined maximum face parameter comprises:

taking a second preset face parameter as a constraint parameter of an image generation model, and training the image generation model based on the first facial sample image and the second facial sample image to obtain a facial image generation model;

taking a first preset face parameter as a constraint parameter of the facial image generation model, and obtaining, based on the facial image generation model, a face shape adjustment sample image corresponding to a third facial sample image, wherein a face parameter corresponding to the third facial sample image is the minimum face parameter;

training a style image generation model based on the third facial sample image and the face shape adjustment sample image to obtain the face shape adjustment model.

8. An electronic device, comprising a memory and a processor, wherein the memory stores a computer program, and the computer program, when executed by the processor, causes the processor to:

acquire an original facial image; and generate a face shape adjustment image corresponding to the original facial image by using a pre-trained face shape adjustment model, wherein the face shape adjustment model is obtained by training based on a first facial sample image, a second facial sample image, a minimum face parameter and a maximum face parameter, a face parameter corresponding to the first facial sample image is the minimum face parameter, and a face parameter corresponding to the second facial sample image is the maximum face parameter, wherein a face parameter corresponding to the face shape adjustment image obtained by using the face shape adjustment model is the same as a face parameter preset in a model training stage, wherein an adjustment degree of the face shape adjustment image relative to the original facial image is within a degree range determined from an adjustment degree indicated by the minimum face parameter and an adjustment degree indicated by the maximum face parameter, and wherein the face shape adjustment model comprises a fat face adjustment model, accordingly, generating the face shape adjustment image corresponding to the original facial image by using the pre-trained face shape adjustment model comprises: generating, by using the fat face adjustment model, a face shape adjustment image, corresponding to the original facial image, in which a face shape becomes fat.

9. The electronic device according to claim 8, wherein the face shape adjustment model comprises a thin face adjustment model;

accordingly, the processor is caused to:

generate, by using the thin face adjustment model, a face shape adjustment image, corresponding to the original facial image, in which a face shape becomes thin.

10. The electronic device according to claim 9, wherein:

the face shape adjustment model is obtained by training based on a third facial sample image and a face shape adjustment sample image, wherein a face parameter corresponding to the third facial sample image is the minimum face parameter;

the face shape adjustment sample image is generated by a pre-trained facial image generation model based on the third facial sample image and a first preset face parameter;

the facial image generation model is obtained by training based on the first facial sample image, the second facial sample image and a second preset face parameter;

the minimum face parameter is a lower limit of values of the first preset face parameter and the second preset face parameter, and the maximum face parameter is an upper limit of values of the first preset face parameter and the second preset face parameter.

11. The electronic device according to claim 8, wherein:

the face shape adjustment model is obtained by training based on a third facial sample image and a face shape adjustment sample image, wherein a face parameter corresponding to the third facial sample image is the minimum face parameter;

the face shape adjustment sample image is generated by a pre-trained facial image generation model based on the third facial sample image and a first preset face parameter;

the facial image generation model is obtained by training based on the first facial sample image, the second facial sample image and a second preset face parameter;

the minimum face parameter is a lower limit of values of the first preset face parameter and the second preset face parameter, and the maximum face parameter is an upper limit of values of the first preset face parameter and the second preset face parameter.

12. The electronic device according to claim 11, wherein the face shape adjustment model is obtained by training based on the third facial sample image and the face shape adjustment sample image in which preset editing processing is performed, and the face shape adjustment sample image in which the preset editing processing is performed comprises at least one of the following:

a face shape adjustment sample image in which filtering processing is performed on a face area;

a face shape adjustment sample image in which deformation processing is performed on a face shape;

a face shape adjustment sample image in which background restoration is performed based on a background of the third facial sample image;

a face shape adjustment sample image in which an image clarity is adjusted.

13. A non-transitory computer-readable storage medium, wherein the computer-readable storage medium stores a computer program, and the computer program, when executed by a computing device, causes the computing device to implement the method for generating a face shape adjustment image according to claim 1.

14. The storage medium according to claim 13, wherein the face shape adjustment model comprises a thin face adjustment model;

accordingly, the computing device is caused to:

generate, by using the thin face adjustment model, a face shape adjustment image, corresponding to the original facial image, in which a face shape becomes thin.

15. The storage medium according to claim 13, wherein:

the face shape adjustment model is obtained by training based on a third facial sample image and a face shape adjustment sample image, wherein a face parameter corresponding to the third facial sample image is the minimum face parameter;

the face shape adjustment sample image is generated by a pre-trained facial image generation model based on the third facial sample image and a first preset face parameter;

the facial image generation model is obtained by training based on the first facial sample image, the second facial sample image and a second preset face parameter;

the minimum face parameter is a lower limit of values of the first preset face parameter and the second preset face parameter, and the maximum face parameter is an upper limit of values of the first preset face parameter and the second preset face parameter.

16. The storage medium according to claim 15, wherein the face shape adjustment model is obtained by training based on the third facial sample image and the face shape adjustment sample image in which preset editing processing is performed, and the face shape adjustment sample image in which the preset editing processing is performed comprises at least one of the following:

a face shape adjustment sample image in which filtering processing is performed on a face area;

a face shape adjustment sample image in which deformation processing is performed on a face shape;

a face shape adjustment sample image in which background restoration is performed based on a background of the third facial sample image;

a face shape adjustment sample image in which an image clarity is adjusted.

17. An electronic device, comprising a memory and a processor, wherein the memory stores a computer program, and the computer program, when executed by the processor, causes the processor to implement the method for training a face shape adjustment model according to claim 6.

18. The electronic device according to claim 17, wherein the processor is caused to:

take a second preset face parameter as a constraint parameter of an image generation model, and train the image generation model based on the first facial sample image and the second facial sample image to obtain a facial image generation model;

take a first preset face parameter as a constraint parameter of the facial image generation model, and obtain, based on the facial image generation model, a face shape adjustment sample image corresponding to a third facial sample image, wherein a face parameter corresponding to the third facial sample image is the minimum face parameter;

train a style image generation model based on the third facial sample image and the face shape adjustment sample image to obtain the face shape adjustment model.

19. A non-transitory computer-readable storage medium, wherein the computer-readable storage medium stores a computer program, and the computer program, when executed by a computing device, causes the computing device to implement the method for training a face shape adjustment model according to claim 6.

20. The storage medium according to claim 19, wherein the computing device is caused to:

take a second preset face parameter as a constraint parameter of an image generation model, and training the image generation model based on the first facial sample image and the second facial sample image to obtain a facial image generation model;

take a first preset face parameter as a constraint parameter of the facial image generation model, and obtain, based on the facial image generation model, a face shape adjustment sample image corresponding to a third facial sample image, wherein a face parameter corresponding to the third facial sample image is the minimum face parameter;

train a style image generation model based on the third facial sample image and the face shape adjustment sample image to obtain the face shape adjustment model.

\* \* \* \* \*